(12) United States Patent
Tsuboi et al.

(10) Patent No.: US 8,061,498 B2
(45) Date of Patent: Nov. 22, 2011

(54) WET CLUTCH FRICTION PLATE

(75) Inventors: Akira Tsuboi, Shizuoka (JP); Satoshi Kawamura, Shizuoka (JP); Mitsuo Miyatsu, Shizuoka (JP); Fumiyoshi Iida, Shizuoka (JP)

(73) Assignee: Kabushiki Kaisha F.C.C., Shizuoka (JP)

( * ) Notice: Subject to any disclaimer, the term of this patent is extended or adjusted under 35 U.S.C. 154(b) by 692 days.

(21) Appl. No.: 10/591,320

(22) PCT Filed: Mar. 4, 2004

(86) PCT No.: PCT/JP2004/002737
§ 371 (c)(1),
(2), (4) Date: Jun. 2, 2007

(87) PCT Pub. No.: WO2005/085667
PCT Pub. Date: Sep. 15, 2005

(65) Prior Publication Data
US 2007/0278062 A1 Dec. 6, 2007

(51) Int. Cl.
*F16D 13/00* (2006.01)
(52) U.S. Cl. .................................. 192/113.36
(58) Field of Classification Search .............. 192/113.36
See application file for complete search history.

(56) References Cited

U.S. PATENT DOCUMENTS

| | | | | |
|---|---|---|---|---|
| 4,396,100 A | * | 8/1983 | Eltze | 192/70.12 |
| 4,878,282 A | * | 11/1989 | Bauer | 29/527.4 |
| 4,967,893 A | * | 11/1990 | Vogele | 192/107 R |
| 6,135,256 A | * | 10/2000 | Han et al. | 192/70.12 |
| 6,899,783 B2 | * | 5/2005 | Oguri et al. | 156/259 |
| 2001/0023803 A1 | * | 9/2001 | Hattori | 192/3.29 |
| 2007/0000747 A1 | * | 1/2007 | Miyazaki | 192/70.12 |

FOREIGN PATENT DOCUMENTS

| | | |
|---|---|---|
| DE | 2950349 A1 | 8/1983 |
| FR | 2472113 A1 | 6/1981 |
| GB | 2065802 A | 7/1981 |
| JP | 56-94030 A | 7/1984 |
| JP | 62-66032 U | 4/1987 |
| JP | 2-203029 A | 8/1990 |
| JP | 8-166025 A | 6/1996 |
| JP | 11-336805 A | 12/1999 |
| JP | 2001-221252 A | 8/2001 |
| JP | 2004-76896 A | 3/2004 |

* cited by examiner

*Primary Examiner* — David D Le
*Assistant Examiner* — Ryan Dodd
(74) *Attorney, Agent, or Firm* — Arent Fox, LLP

(57) ABSTRACT

A wet clutch friction plate is provided in which a plurality of oil channels (22) are formed in a friction material (21) bonded to one side face or opposite side faces of a core plate (20), the plurality of oil channels (22) providing communication between inner and outer peripheral edges of the friction material (21), and a plurality of oil channels (22) having a discharge angle (β) that discharge oil from an inner peripheral side to an outer peripheral side of the friction plate (15) when the friction plate (15) rotates and a plurality of oil channels (22) having an inflow angle (α) that draw oil in from the outer peripheral side to the inner peripheral side of the friction plate (15) are mixed at substantially equal intervals. In this way, the frictional properties can be stabilized when connection of the clutch is in transition, and the phenomenon of drag due to oil viscosity resistance can be suppressed when the clutch is in an off state.

14 Claims, 6 Drawing Sheets ial No. PCT/JP2004/002737, filed Mar. 4, 2004, the entire specification claims and drawings of which are incorporated herewith by reference.

WET CLUTCH FRICTION PLATE

This application is a National Stage entry of International Application No. PCT/JP2004/002737, filed Mar. 4, 2004, the entire specification claims and drawings of which are incorporated herewith by reference.

FIELD OF THE INVENTION

The present invention relates to a wet clutch friction plate and, in particular, to an improvement of one formed from a core plate and a friction material bonded to a side face of the core plate, a plurality of oil channels being formed in the friction material so as to provide communication between inner and outer peripheral edges of the friction material.

BACKGROUND ART

Such a wet clutch friction plate is already known, as disclosed in, for example, Japanese Patent Application Laid-open No. 2001-221252.

In such a wet clutch friction plate it is necessary, for example, to improve frictional properties in order to suppress the occurrence of abnormal noise or vibration due to stick-slip by stabilizing frictional properties when connection of the clutch is in transition even under conditions in which there is a small amount of oil (first problem), and it is also necessary to reduce the phenomenon of drag due to oil viscosity resistance when the clutch is disengaged (second problem).

However, conventionally, countermeasures are taken against the first problem by reducing the oil discharge properties by narrowing the width of the oil channels on the surface of the friction material, whereas countermeasures are taken against the second problem by enhancing the oil discharge properties by widening the width of the oil channels on the surface of the friction material, which is the opposite of the above-mentioned countermeasures; as a consequence, it is difficult to solve the two problems simultaneously and, in reality, solution of one of the first and second problems is sacrificed in accordance with the intended application or the specification of the wet clutch.

DISCLOSURE OF THE INVENTION

The present invention has been accomplished under the above-mentioned circumstances, and it is an object thereof to provide a wet clutch friction plate that enables the first and second problems to be solved at the same time.

In order to attain the above object, in accordance with a first aspect of the present invention, there is provided a wet clutch friction plate comprising a core plate and a friction material bonded to a side face of the core plate, a plurality of oil channels being formed in the friction material so as to provide communication between inner and outer peripheral edges of the friction material, characterized in that a plurality of oil channels having a discharge angle that discharge oil from an inner peripheral side to an outer peripheral side of the friction plate when the friction plate rotates and a plurality of oil channels having an inflow angle that draw oil in from the outer peripheral side to the inner peripheral side of the friction plate are mixed at substantially equal intervals.

In accordance with this first aspect, since the plurality of oil channels for promoting the inflow of oil and the plurality of oil channels for promoting the discharge of oil are mixed on the friction plate at substantially equal intervals, it is possible to stabilize the frictional properties by obtaining an appropriate inflow of oil uniformly in the peripheral direction even in a half-clutch state under conditions in which there is a small amount of oil and prevent the occurrence of abnormal sound or vibration due to stick-slip, and when the clutch is disengaged it is possible to suppress the phenomenon of drag due to oil viscosity resistance by obtaining appropriate oil discharge properties uniformly in the peripheral direction.

Further, in accordance with a second aspect of the present invention, in addition to the first aspect, the friction plate is divided into a plurality of regions arranged in the peripheral direction, a plurality of oil channels parallel to each other are formed in the friction material of each region, and one oil channel and another oil channel that are positioned at opposite end parts in the peripheral direction of each region are given the discharge angle and the inflow angle respectively.

In accordance with this second aspect, since the plurality of oil channels in each section are parallel to each other, it is possible to easily form the plurality of oil channels including ones having an inflow angle and a discharge angle, respectively.

The above-mentioned object, other objects, characteristics, and advantages of the present invention will become apparent from an explanation of preferred embodiments that will be described in detail below by reference to the attached drawings.

BEST MODE FOR CARRYING OUT THE INVENTION

Preferred embodiments of the present invention are explained below by reference to the attached drawings.

Figure 1:
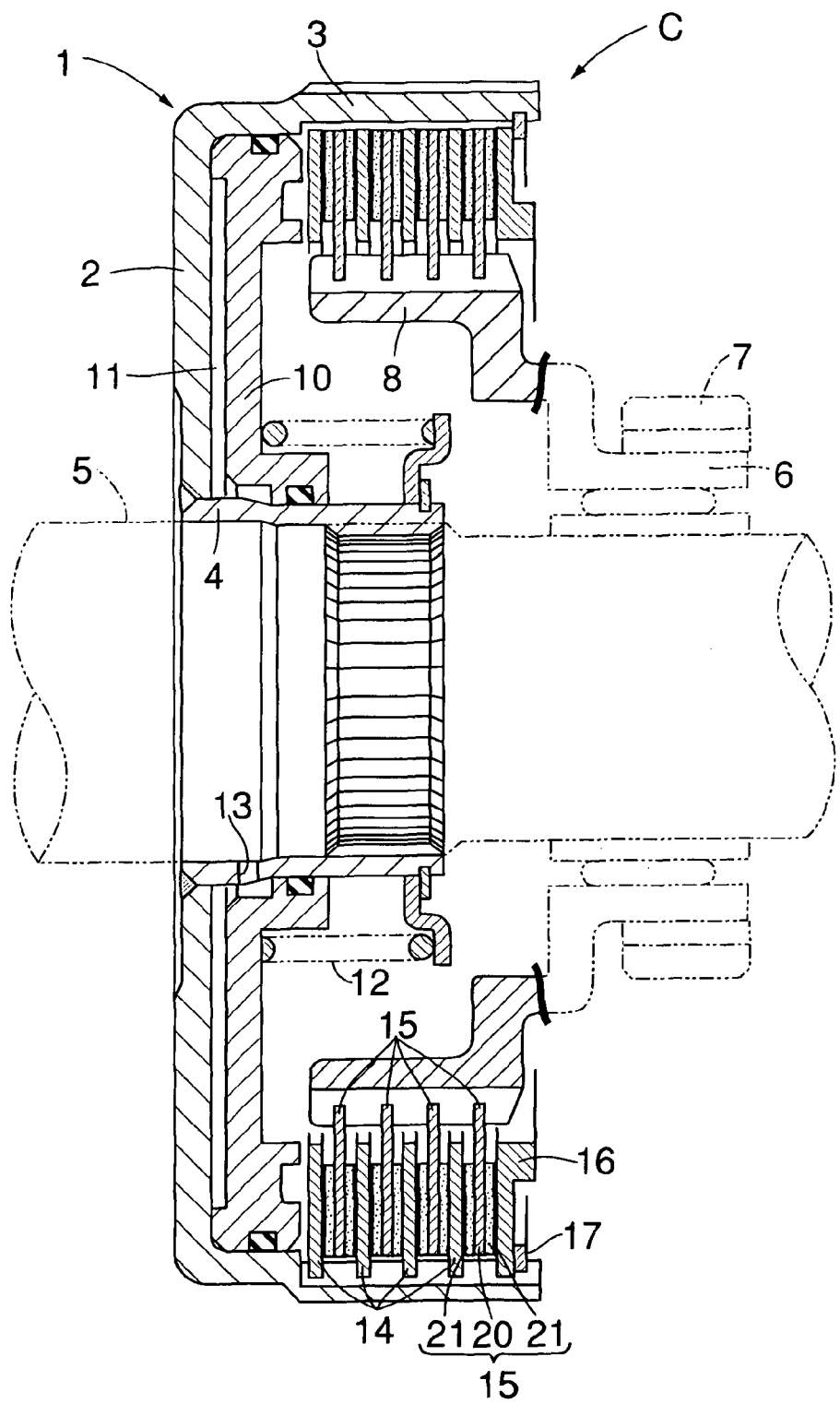
FIG. 1 is a vertical sectional view of a wet clutch equipped with a friction plate related to a first embodiment of the present invention.
Figure 2:
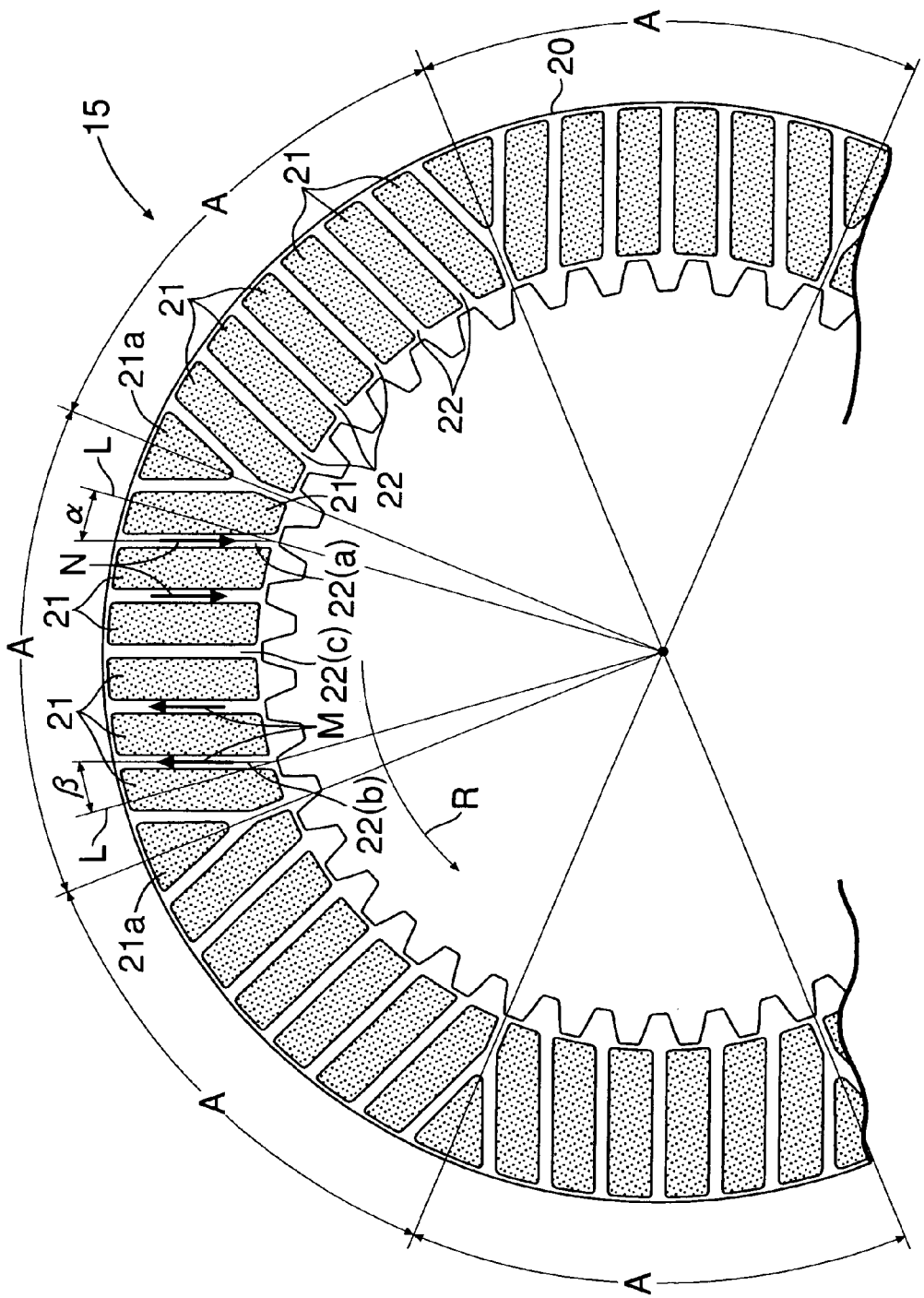
FIG. 2 is a side view of the friction plate of FIG. 1.

A first embodiment of the present invention shown in FIG. 1 and FIG. 2 is now explained.

In FIG. 1, reference symbol C denotes an automobile automatic transmission wet clutch. A clutch housing 1 of this clutch C is formed by connecting a cylindrical portion 3 and a hub 4 to outer and inner peripheral ends respectively of an end wall 2, and the hub 4 is spline-coupled to an input shaft 5. An output shaft 6 integrally equipped with a drive gear 7 is relatively rotatably supported on the input shaft 5, and a clutch inner 8 integrally connected to the output shaft 6 is concentrically disposed within the cylindrical portion 3.

A pressure piston 10 forming a hydraulic chamber 11 between itself and the end wall 2 is slidably fitted between an inner peripheral face of the cylindrical portion 3 and an outer peripheral face of the hub 4, and a return spring 12 urging the pressure piston 10 toward the hydraulic chamber 11 side is provided in a compressed state between the pressure piston 10 and the hub 4. A hydraulic oil supply/discharge hole 13 communicating with the hydraulic chamber 11 is provided in the hub 4.

A plurality of metal clutch plates 14 are slidably spline-fitted to the inner peripheral face of the cylindrical portion 3 so as to adjoin the outer side of the pressure piston 10, and a plurality of friction plates 15 of the present invention are slidably spline-fitted onto an outer peripheral face of the clutch inner 8, the clutch plates 14 and the friction plates 15 being alternately superimposed. Furthermore, a pressure-receiving plate 16 facing an outer face of the friction plate 15 on the outermost side is spline-fitted into the cylindrical portion 3, and this pressure-receiving plate 16 is prevented from moving axially outward by a retaining ring 17 latched on the cylindrical portion 3.

This clutch C is partially immersed in an oil reservoir in a base portion of a transmission case where oil accumulates, and the oil is supplied for cooling during rotation.

The friction plate 15 of the present invention is now explained by reference to FIG. 1 and FIG. 2.

The friction plate 15 is formed from a metal core plate 20 and a friction material 21 bonded to opposite sides of the core plate 20 by means of an adhesive, etc., and each friction material 21 is provided with a plurality of oil channels 22 extending in a straight line and providing communication between inner and outer peripheral edges of the friction material 21.

The friction plate 15 is divided into a plurality of regions A arranged in the peripheral direction, the friction material 21 of each region A is provided with a plurality of oil channels 22, which are parallel to each other, and an oil channel 22($c$) at the center in the peripheral direction of each region A is positioned on a radial line L of the friction plate 15. Here, ends, on the inner peripheral side of the friction plate 15, of the oil channels 22 are called inner ends, and ends on the outer peripheral side are called outer ends.

In each region A, the oil channels 22 on the rear side along a rotational direction R of the friction plate 15 relative to the central oil channel 22($c$) are given an inflow angle $\alpha$ such that the oil channel 22 is inclined forward in the rotational direction R of the friction plate 15 relative to a radial line L of the friction plate 15 passing through the inner end of the oil channel 22, whereas the oil channels 22 on the front side along the rotational direction R are given a discharge angle $\beta$ such that the oil channel 22 is inclined rearward in the rotational direction R of the friction plate 15 relative to a radial line L of the friction plate 15 passing through the inner end of the oil channel 22. In the case of this first embodiment, the inflow angle $\alpha$ of the oil channel 22($a$) in a rear end portion along the rotational direction R of each region A is equal to the discharge angle $\beta$ of the oil channel 22($b$) in a front end portion along the rotational direction R.

A triangular small piece 21$a$ of the friction material 21 remains at the boundary between adjacent regions A and A of the friction material 21.

In the case of this embodiment, a large number of friction materials 21 cut into a strip shape are bonded to the core plate 15 at fixed intervals, and the oil channels 22 are formed therebetween.

The rotational direction R of the friction plate 15 referred to here means the direction of rotation of the friction plate 15 relative to the clutch plate 14.

The operation of this first embodiment is now explained.

When hydraulic pressure is supplied to the hydraulic chamber 11 of the clutch C, the pressure piston 10 receives the hydraulic pressure and moves forward against the load of the return spring 12, that is, it slides toward a group of the friction plates 15 and the clutch plates 14 and clamps them between itself and the pressure-receiving plate 16, and the friction plates 15 and the clutch plates 14 are thus frictionally engaged with each other. The clutch C, which thereby attains a clutch ON state, allows a force to be transmitted from the input shaft 5 to the output shaft 6. Furthermore, when the hydraulic pressure is released from the hydraulic chamber 11, the pressure piston 10 retreats due to the load of the return spring 12, the friction plates 15 and the clutch plates 14 are freed, and the clutch C attains a clutch OFF state in which the transmission of force between the input shaft 5 and the output shaft 6 is cut off.

In such a clutch OFF state or in a half clutch state, relative rotation occurs between the friction plates 15 and the clutch plates 14 due to relative rotation between the input shaft 5 and the output shaft 6. In this process, when the friction plate 15 rotates relative to the clutch plate 14 in the direction shown by arrow R, in each region A of each friction material 21, the oil channels 22 given the inflow angle $\alpha$ exhibit a screw pump action as a result of cooperation with the adjacent clutch plate 14, thus drawing in the oil that is in contact with the outer periphery of the friction plate 15 toward the inner peripheral side of the friction material 21 through the oil channels 22 as shown by arrows N in FIG. 2, whereas the oil channels 22 given the discharge angle $\beta$ exhibit a screw pump action as a result of cooperation with the adjacent clutch plate 14, thus pushing out the oil within the oil channels 22 toward the outer peripheral side of the friction material 21 as shown by arrows M in FIG. 2.

In this way, since the plurality of oil channels 22 for promoting the inflow of the oil and the plurality of oil channels 22 for promoting the discharge of the oil are mixed on the friction plate 15 at substantially equal intervals, it is possible to stabilize the frictional properties by obtaining an appropriate oil inflow uniformly in the peripheral direction even in a half-clutch state under conditions in which there is a small amount of oil and prevent the occurrence of abnormal sound or vibration due to stick-slip, and when the clutch is disengaged it is possible to suppress the phenomenon of drag due to oil viscosity resistance by obtaining appropriate oil discharge properties uniformly in the peripheral direction.

Figure 5A:
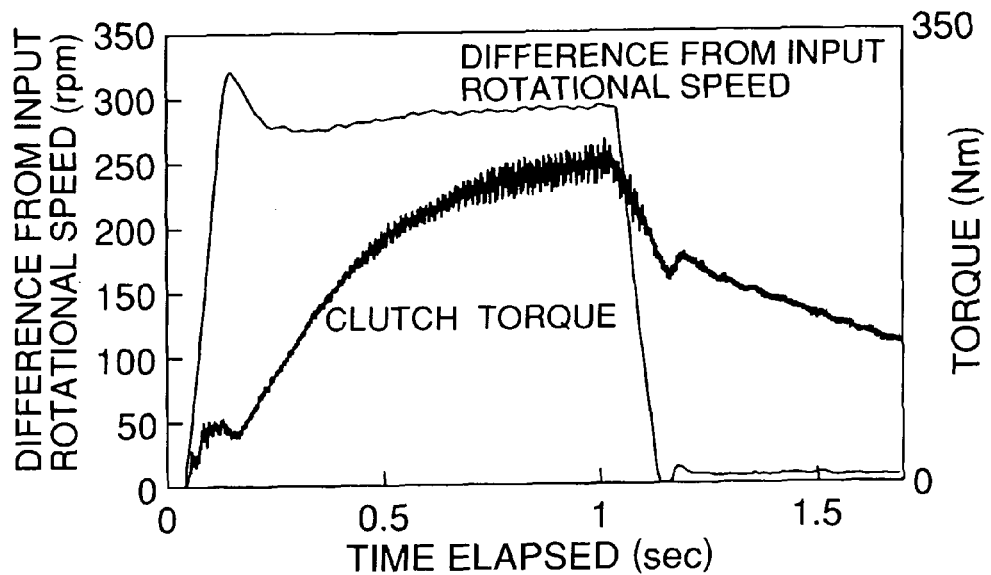
FIG. 5A is a graph showing torque vibration properties of a wet clutch employing a conventional friction plate.
Figure 5B:
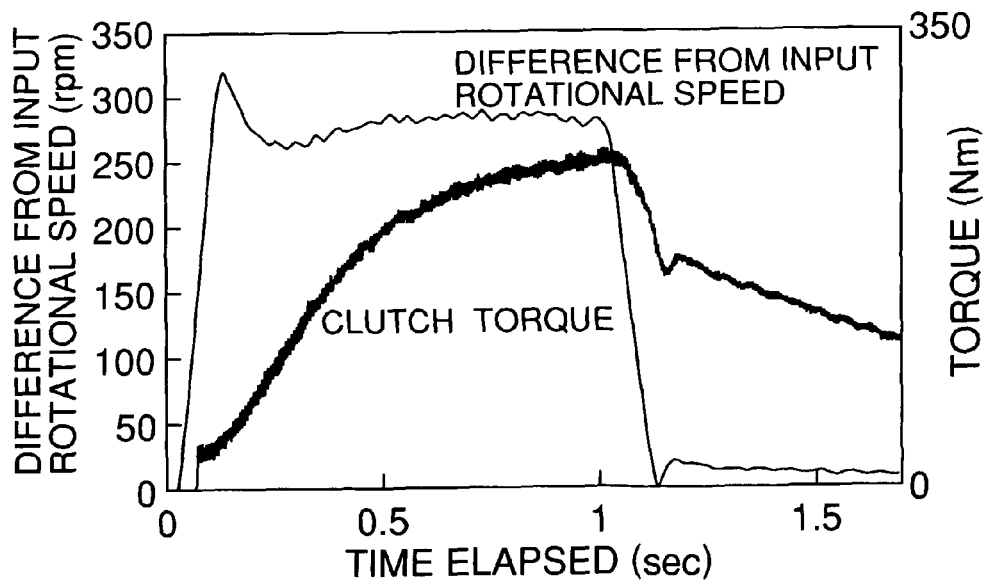
FIG. 5B is a graph showing torque vibration properties of a wet clutch employing the friction plate of the present invention.
Figure 6:
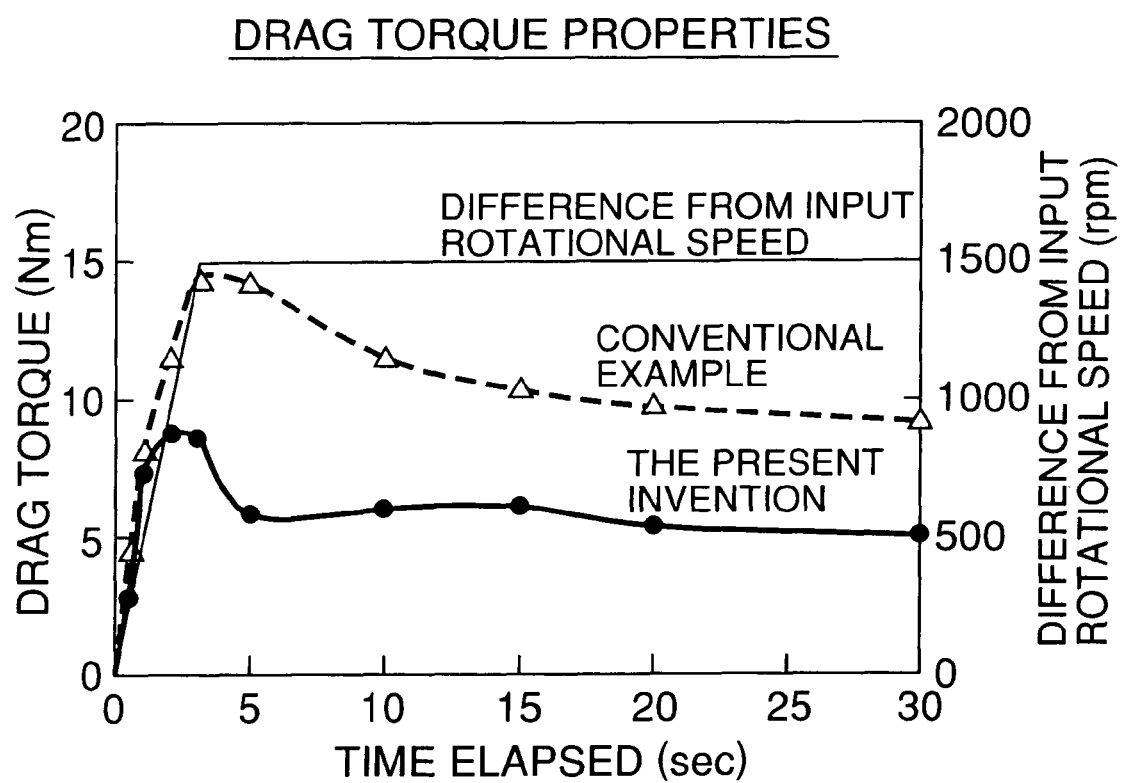
FIG. 6 is a graph for comparing drag torque between a wet clutch employing a conventional friction plate and a wet clutch employing the friction plate of the present invention.

In accordance with a test, it has been confirmed that as shown in FIG. 5A, in a clutch into which a conventional friction plate is incorporated, when the transmission torque of the clutch is increased under conditions in which there is a small amount of oil, severe vibration occurs, particularly where the torque is high, whereas as shown in FIG. 5B in the case of the present invention, the vibration is greatly suppressed throughout the region. Furthermore, as shown in FIG. 6, it has been confirmed that the drag torque in the clutch OFF state can be greatly reduced in the case of the present invention.

Figure 3:
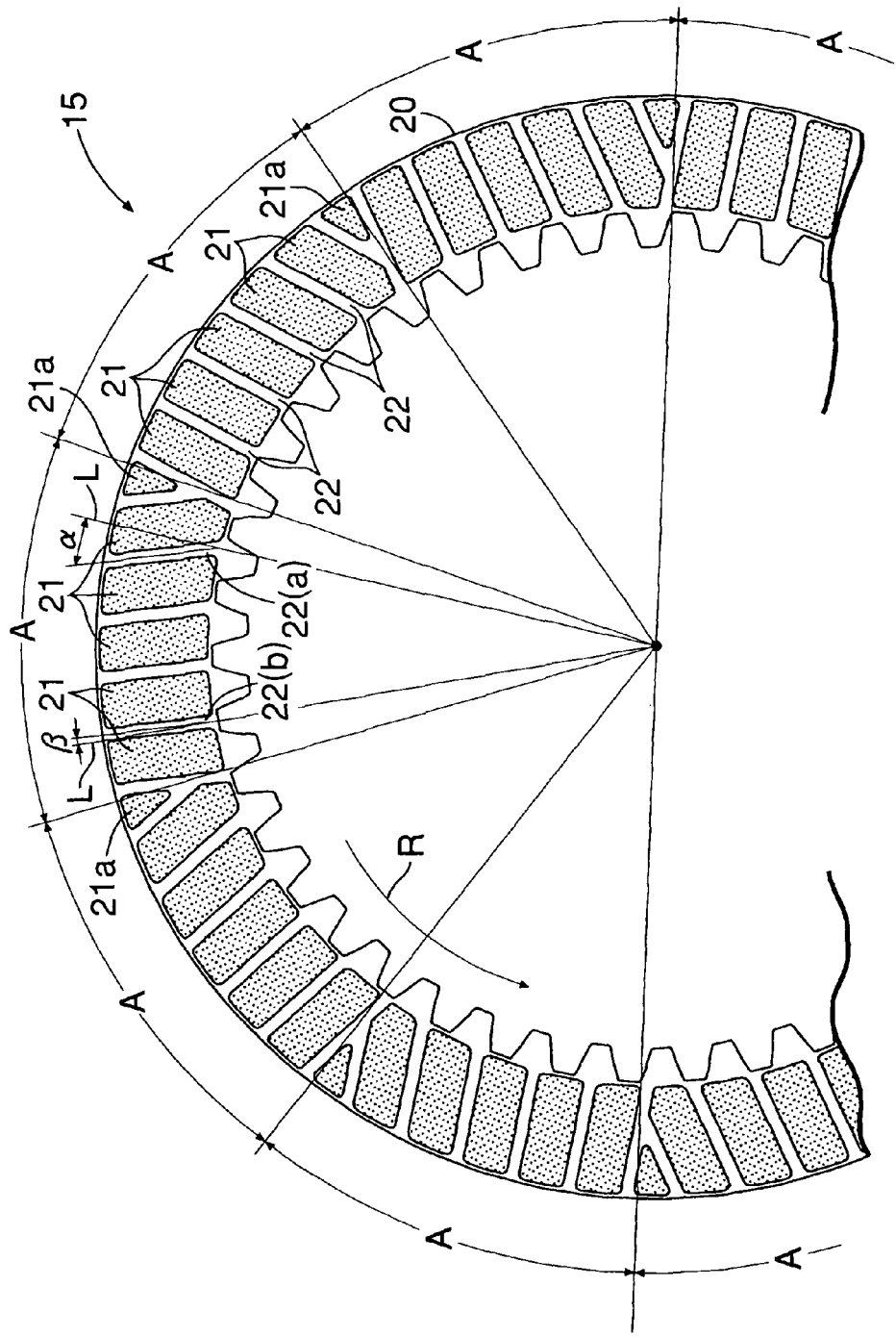
FIG. 3 is a side view of a friction plate related to a second embodiment of the present invention.

A second embodiment of the present invention shown in FIG. 3 is now explained.

In this second embodiment, in each of the regions A into which a friction plate 15 is divided in the peripheral direction, a plurality of parallel oil channels 22 are disposed so that an inflow angle $\alpha$ of an oil channel 22($a$) in a rear end part along a rotational direction R of the region A is larger than a discharge angle $\beta$ of an oil channel 22($b$) in a front end part along the rotational direction R. Since the arrangement is otherwise the same as that of the preceding embodiment, parts in FIG. 3 corresponding to the preceding embodiment are denoted by the same reference numerals and symbols as those of the preceding embodiment, and duplication of the explanation is thus avoided.

The friction plate 15 of this second embodiment is particularly effective in a clutch for which the stability of frictional properties is important.

In this way, by appropriately differentiating the inflow angle α of the oil channel 22 in the rear end part and the discharge angle β of the oil channel 22 in the front end part along the rotational direction R in each of the regions A into which the friction plate 15 is divided, the frictional properties can be adjusted.

Figure 4:
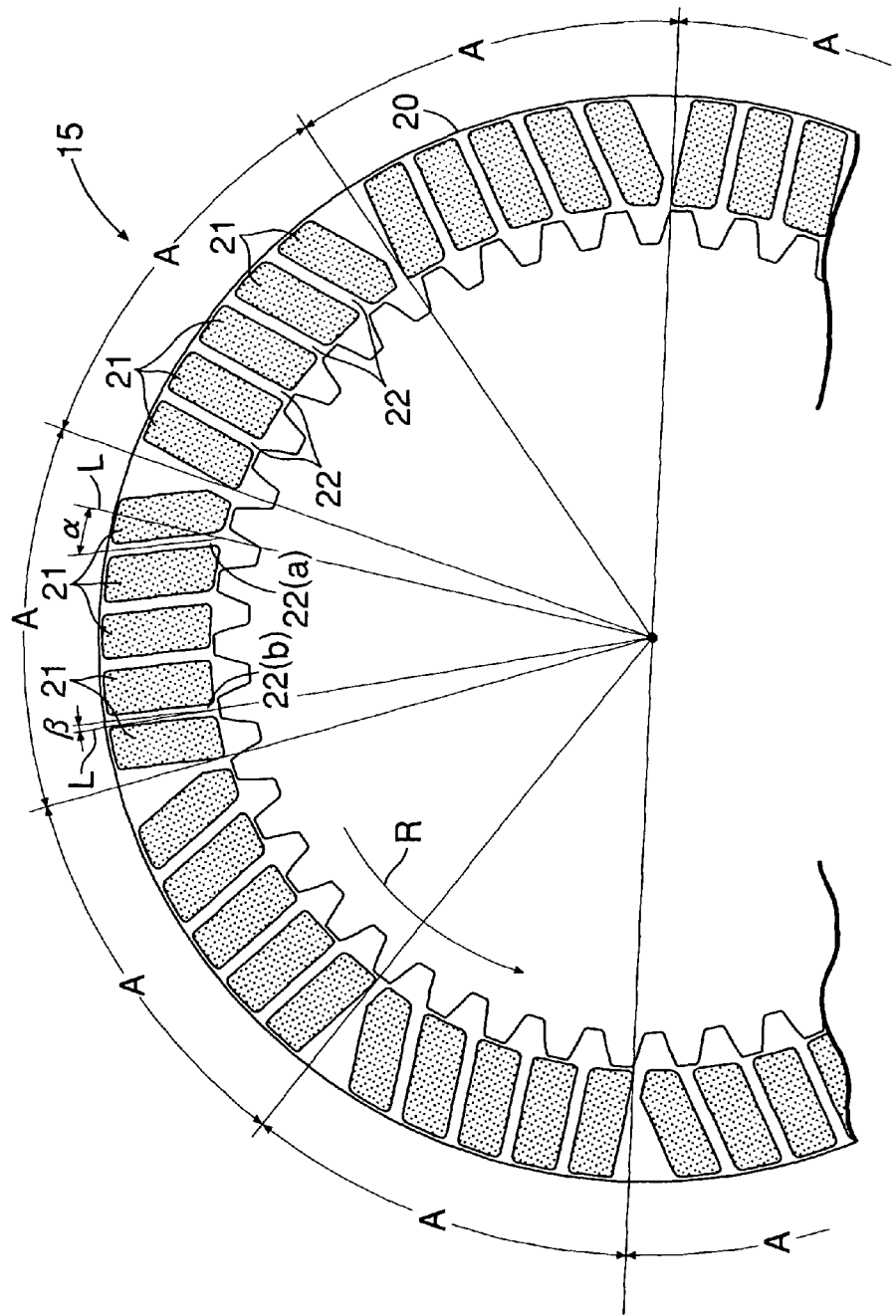
FIG. 4 is a side view of a friction plate related to a third embodiment of the present invention.

A third embodiment of the present invention shown in FIG. 4 corresponds to one obtained by removing triangular small pieces 21a of friction material present at the boundary between adjacent regions A and A of the friction plate 15 in the above-mentioned second embodiment.

The present invention is not limited to the above-mentioned embodiments, and may be modified in a variety of ways as long as the modifications do not depart from the spirit and scope thereof. For example, in the above-mentioned embodiments, the friction material 21 is bonded to the core plate 20 in the form of strip-shaped pieces so as to form the oil channels 22, but oil channels 22 may be formed by bonding an annular sheet of friction material to a core plate 20 and then embossing or cutting the surface of the friction material 21. Furthermore, in the above-mentioned embodiments, the friction material 21 is bonded to opposite sides of the core plate 20 of the friction plate 15, which is spline-fitted onto the clutch inner 8, and the clutch plate 14, which is spline-fitted into the clutch housing 1 and which does not have the friction material, is disposed between the friction plates 15, but friction plates 15 may be spline-fitted to each of a clutch inner 8 and a clutch housing 1, and a friction material 21 may be bonded to only one side of core plates 20 thereof that face each other.

The invention claimed is:

1. A wet clutch friction plate for use with a clutch plate, the friction plate comprising:
    a core plate disposed opposite the clutch plate and rotatable relative to the clutch plate; and
    friction material bonded to a side face of the core plate and disposed between the clutch plate and the core plate,
    wherein a plurality of oil channels are defined in the friction material and provide communication between inner and outer peripheral edges of the friction material,
    wherein the plurality of oil channels include a plurality of discharge oil channels, each discharge oil channel having a discharge angle (β) relative to a radial line (L) of the friction plate passing through an inner end of the discharge oil channel itself and which are configured to discharge oil from an inner peripheral side to an outer peripheral side of the friction plate due to a screw pump action that occurs when the friction plate rotates relative to the clutch plate, and the plurality of oil channels further include a plurality of inflow oil channels, each inflow oil channel having an inflow angle (α) relative to the radial line (L) of the friction plate passing through an inner end of the inflow oil channel itself and which is configured to draw oil in from the outer peripheral side to the inner peripheral side of the friction plate due to the screw pump action that occurs when the friction plate rotates relative to the clutch plate,
    wherein the friction plate is divided into a plurality of regions (A) arranged in the peripheral direction, each region including a number of discharge and inflow oil channels that is equal to a number of discharge and inflow oil channels of the other regions,
    wherein in each of said regions, the number of discharge oil channels is less than the number of inflow oil channels, and
    wherein the discharge angle (β) inclines rearward relative to the radial line (L) and the inflow angle (α) inclines forward relative to the radial line (L).

2. The wet clutch friction plate according to claim 1, wherein a triangular piece of the friction material is provided at a boundary defined between adjacent regions (A and A).

3. The wet clutch friction plate according to claim 1, wherein the discharge angle (β) of at least one discharge oil channel is equal to the inflow angle (α) of at least one inflow oil channel.

4. The wet clutch friction plate according to claim 2, wherein the discharge angle (β) of at least one discharge oil channel is equal to the inflow angle (α) of at least one inflow oil channel.

5. The wet clutch friction plate according to claim 1, wherein the discharge angle (β) of at least one discharge oil channel is less than the inflow angle (α) of at least one inflow oil channel.

6. The wet clutch friction plate according to claim 2, wherein the discharge angle (β) of at least one discharge oil channel is less than the inflow angle (α) of at least one inflow oil channel.

7. The wet clutch friction plate according to claim 1, further comprising a central oil channel defined in the friction material, the central oil channel being positioned intermediate the discharge oil channels and the inflow oil channels, wherein the central oil channel is disposed along an associated radial line (L) of the friction plate.

8. The wet clutch friction plate according to claim 1, wherein the plurality of discharge oil channels are parallel relative to each other.

9. The wet clutch friction plate according to claim 1, wherein the plurality of inflow oil channels are parallel relative to each other.

10. The wet clutch friction plate according to claim 1, wherein in each of said regions, there is provided only one discharge oil channel.

11. The wet clutch friction plate according to claim 1, wherein in each of said regions, the discharge angle (β) of the discharge oil channel is smaller than the inflow angle (α) of any of the inflow oil channels.

12. The wet clutch friction plate according to claim 10, wherein in each of said regions, the discharge angle (β) of the discharge oil channel is smaller than the inflow angle (α) of any of the inflow oil channels.

13. The wet clutch friction plate according to claim 11, wherein the inflow angles (α) of the inflow oil channels are made different from one another and become smaller as they come closer to the discharge oil channel.

14. The wet clutch friction plate according to claim 12, wherein the inflow angles (α) of the inflow oil channels are made different from one another and become smaller as they come closer to the discharge oil channel.

* * * * *